(12) United States Patent
Sinclair et al.

(10) Patent No.: US 7,427,926 B2
(45) Date of Patent: Sep. 23, 2008

(54) ESTABLISHING COMMUNICATION BETWEEN COMPUTING-BASED DEVICES THROUGH MOTION DETECTION

(75) Inventors: Michael Sinclair, Kirkland, WA (US); Kenneth Hinckley, Redmond, VA (US); Darko Kirovski, Kirkland, WA (US); Gideon Yuval, Mercer Island, WA (US); Tom Blank, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 209 days.

(21) Appl. No.: 11/275,757

(22) Filed: Jan. 26, 2006

(65) Prior Publication Data

US 2007/0188323 A1    Aug. 16, 2007

(51) Int. Cl.
*H04L 7/00*    (2006.01)

(52) U.S. Cl. .................. 340/825.2; 340/681; 340/539.1; 340/3.1; 340/3.2; 455/557

(58) Field of Classification Search .............. 340/539.1, 340/568.1, 681, 3.2, 825.2, 318; 455/557, 455/556.1, 41.2, 517, 70
See application file for complete search history.

(56) References Cited

U.S. PATENT DOCUMENTS

| | | | |
|---|---|---|---|
| 6,836,726 B2 * | 12/2004 | Sanchez Peiro | 701/207 |
| 7,009,497 B2 * | 3/2006 | Nicoletti et al. | 340/286.05 |
| 2004/0192383 A1 * | 9/2004 | Zacks et al. | 455/557 |
| 2004/0203381 A1 * | 10/2004 | Cahn et al. | 455/41.2 |
| 2007/0018800 A1 * | 1/2007 | Boss et al. | 340/435 |
| 2007/0026797 A1 * | 2/2007 | Borjeson et al. | 455/41.2 |
| 2008/0036591 A1 * | 2/2008 | Ray | 340/540 |

* cited by examiner

*Primary Examiner*—George A Bugg
*Assistant Examiner*—Hoi C Lau
(74) *Attorney, Agent, or Firm*—Lee & Hayes, PLLC

(57) ABSTRACT

Motion detection notification is described. In an embodiment, a motion detector in a portable device detects a motion of the device and issues an activation signal when the detected motion has a magnitude greater than a preset threshold. A detection notification component in the portable device then receives the activation signal and initiates communication with an additional device that detects a corresponding motion to the motion of the portable device and is configured for communication with the portable device.

11 Claims, 5 Drawing Sheets

ESTABLISHING COMMUNICATION BETWEEN COMPUTING-BASED DEVICES THROUGH MOTION DETECTION

BACKGROUND

The input/output (I/O) capabilities of mobile devices are often compromised due to the nature of the devices and the lack of space to include hardware, such as for data exchange between devices in either a secured or unsecured communications environment. Establishing a simple unsecured communication link for an exchange of data from one mobile device to another can be difficult when having to navigate through a number of menus to input control and access selections on the mobile device through less than optimal hardware, such as a small keypad.

For trusted and secure communications with another device, in addition to having to establish a communication channel (IRDA, Bluetooth, WiFi, cellular, etc.), private data may need to be exchanged over a public, unsecured network. In such a case, the other device may need to be trusted and/or authenticated. In conventional mobile devices, this requires the input of a shared private PIN or equivalent through a public and/or private key communications protocol which can be utilized to facilitate the exchange of encrypted data over an unsecured communication channel.

SUMMARY

This summary is provided to introduce simplified concepts of motion detection notification which is further described below in the Detailed Description. This summary is not intended to identify essential features of the claimed subject matter, nor is it intended for use in determining the scope of the claimed subject matter.

In an embodiment of motion detection notification, a motion detector in a portable device detects a motion of the device and issues an activation signal when the detected motion has a magnitude greater than a preset threshold. A detection notification component in the portable device then receives the activation signal and initiates communication with an additional device that detects a corresponding motion to the motion of the portable device and is configured for communication with the portable device.

In another embodiment of motion detection notification, the motion detector in the portable device registers the motion as a bump contact between the portable device and the additional device. The detection notification component then determines that a magnitude of the bump contact is at least equivalent to the preset threshold in the portable device, and initiates the communication with the additional device based on detecting the bump contact and determining the magnitude of the bump contact.

BRIEF DESCRIPTION OF THE DRAWINGS

The same numbers are used throughout the drawings to reference like features and components.

DETAILED DESCRIPTION

Motion detection notification is described in which embodiments provide for the initiation of wireless communication between a portable computing-based device and another portable or fixed computing-based device when both devices are subjected to a common motion. A motion detector in each device detects the common motion and the devices initiate communication after establishing that the motion is common to both devices. In one implementation the common motion may include bump contacting the devices together.

Motion detection notification also provides that two computing-based devices can establish secure wireless communication by subjecting the devices to several common motions, such as bump contacting the devices together several times or moving the devices together in a synchronous manner. Information corresponding to the several common motions is detected by a motion detector in both devices and can be used to create a private key to enable wireless encrypted communications between the devices.

While aspects of described systems and methods for motion detection notification can be implemented in any number of different computing systems, environments, and/or configurations, embodiments of motion detection notification are described in the context of the following exemplary system architecture(s).

An Exemplary System

Figure 1:
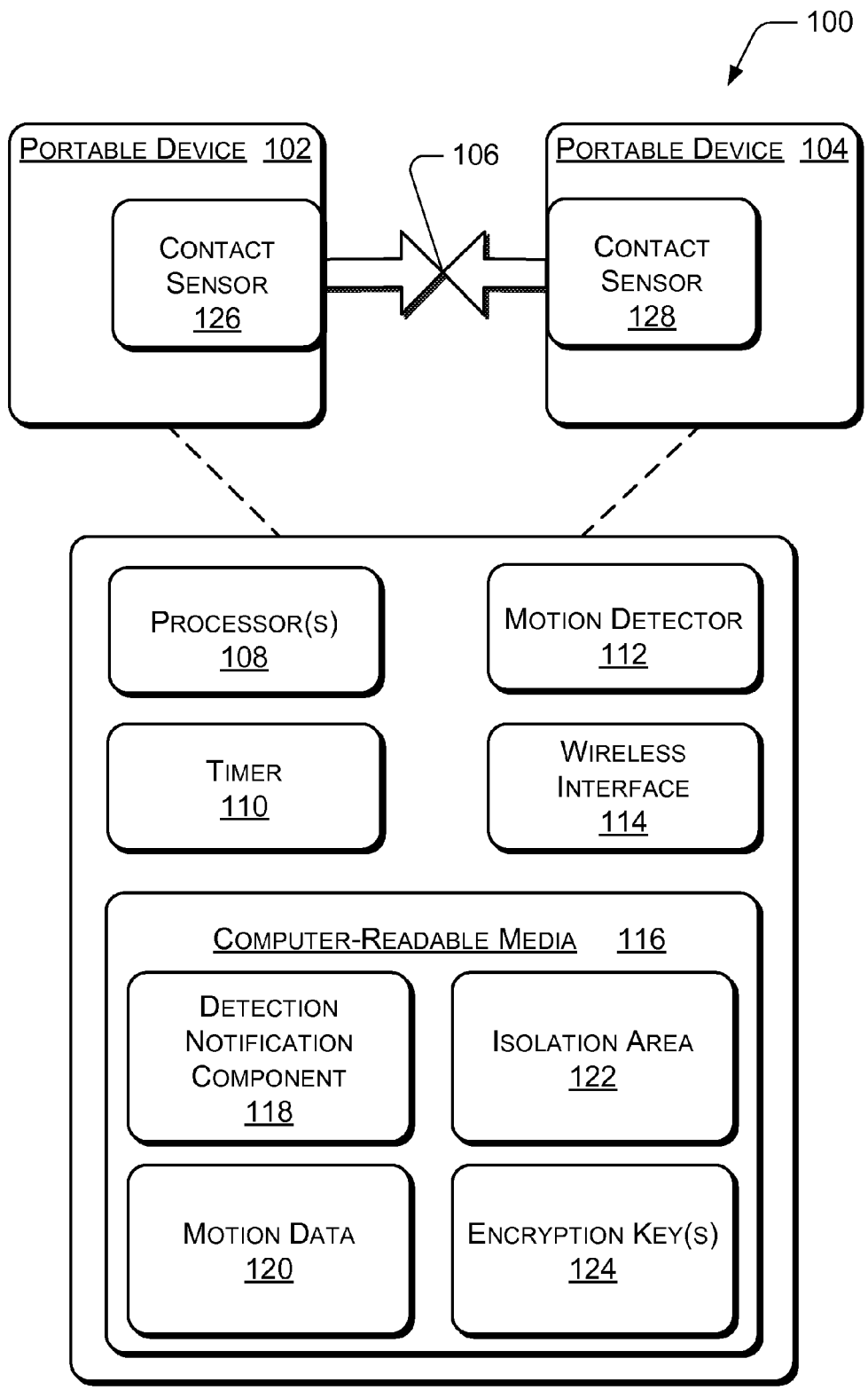
FIG. 1 illustrates an exemplary motion detection notification system in which embodiments of motion detection notification can be implemented.

FIG. 1 illustrates an exemplary motion detection notification system 100 in which embodiments of motion detection notification can be implemented. The system 100 includes a first device 102 and a second device 104. In this example, the first device 102 and the second device 104 are portable computing-based devices that can be bump contacted together at 106. Examples of such devices can include game controllers, keyboards, remote controls, laptops, mobile phones, printers, Mp3 players, monitors, PDAs, mouses, assorted computer peripherals, etc. In addition to being a portable device, one of the devices 102, 104 can also be a stationary device, such as a mainframe computer, a light switch, a light fixture, a thermostat, an electrical outlet, a trade show display, etc.

Each of the devices 102, 104 can include one or more processor(s) 108, a timer 110, a motion detector 112, a wireless interface 114, and computer-readable media 116. The processor(s) 108 can access and/or execute computer-program instructions stored on computer-readable media 116, which in this example, includes a detection notification component 118, motion data 120, an isolation area 122, and encryption keys 124. Moreover, each of the devices 102, 104 can include contact sensors 126, 128. Additionally, either of the portable computing-based devices 102, 104 can be implemented with any number and/or combination of differing components as further described below with reference to the exemplary computing-based device 500 shown in FIG. 5.

The detection notification component 118 can enable the device 102 to locate another device 104 that has shared or detected a common motion or contact, and begin communicating with the other device 104. For example, if device 102 is bumped against device 104, motion data 120 from the bump can be detected by motion detectors 112 in each of the devices 102, 104. Motion detector 112 can include any device capable of measuring the motion data 120 which can include scalar and/or vector characteristics of an object's motion, including direction, velocity, and/or acceleration of the object. In one implementation, motion detector 112 may be an accelerometer such as a MEMS accelerometer. Alternatively, motion detector 112 may be a piezoelectric device, an acceleration detector, and/or any other type of motion detecting device or combination of components.

In another embodiment, contact between devices 102, 104, or contact between the devices 102, 104 and a user can be detected by contact sensors 126, 128. Contact sensors 126, 128 can be implemented with metal or metalized contacts, and with any other device or technology known in the art which may be used to measure physical contact between, for example: (1) the sensor 126, 128 and a respective device 102, 104; (2) the sensor 126, 128 and another sensor 126, 128; and/or (3) the sensor 126, 128 and a user who may be holding the device 102, 104. Sensors 126, 128 can also be implemented to collect information regarding individual users contacting the devices 102, 104, including such qualities as pulse, temperature, etc.

Bump contact 106 between devices 102, 104 can trigger the timers 110 in each of the devices 102, 104 to issue a time stamp that indicates when the bump contact 106 was approximately detected. Detection notification component 118 can then determine if the motion resulting from the bump contact 106 equals or exceeds a preset threshold for motion or contact. If the motion or contact is determined to equal or exceed the preset threshold, the detection notification component 118 in either device 102 or device 104 can initiate communication with the other bumped device 102, 104. The threshold for motion or contact can be set to such a level as to exclude minor jostling and background movement that is common with such portable devices and that may activate the detection notification component 118 and/or the timer 110 in either device 102, 104.

In another implementation, rather than, or in addition to, the preset threshold, the contact sensors 126, 128 may cause an activation signal to be sent to the processor(s) 108, the timer 110, and/or the detection notification component 118 when the contact sensors 126, 128 register contact with one another or with another device 102, 104. Alternatively, when bump contact 106 is registered at the motion detector 112, and at least one of the sensors 126, 128 registers contact with a user (indicating, for example, that the user is holding the device 102, 104 with the sensor 126, 128 in his hand when the bump contact 106 occurs), the contact sensors 126, 128 and/or detection notification component 118 may cause an activation signal to be sent to the processor(s) 108, the timer 110, and/or the detection notification component 118.

In another possible implementation, a bump contact 106 resulting in motion above the motion or contact threshold, can initiate the motion detector 112 to transmit an activation signal directly to the processor(s) 108, the timer 110, and/or the detection notification component 118. In an event that the motion detector 112 transmits the activation signal to less than all of the elements 108, 110, 118, the activated element(s) 108, 110, 118 may subsequently transmit activation signal(s) to initiate or "wake up" the other remaining elements 108, 110, 118.

Similarly, if bump contact 106 is registered at the motion detector 112 in device 104, for example, and the contact sensor 126 registers contact with another contact sensor 128, or with device 104, the contact sensor 126 may act along with the motion detector 112 to cause an activation signal to be sent to the processor(s) 108, the timer 110, and/or the detection notification component 118. An example of such an operation might include registering bump contact 106 at the motion detector 112, then querying sensor 126 using the motion detector 112 or the detection notification component 118 to determine if the sensor 126 contacted another sensor 128 or device 104. If the sensor 126 answers in the affirmative, then sensor 126 and/or motion detector 112 may cause the activation signal to be sent to the processor(s) 108, the timer 110, and/or the detection notification component 118.

Similarly, if bump contact 106 is registered at motion detector 112 in device 104, and contact sensor 126 registers contact with a user, the contact sensor 126 may act alone or with motion detector 112 to cause an activation signal to be sent to the processor(s) 108, the timer 110, and/or the detection notification component 118. In yet another possible implementation, if the contact sensor 126 registers contact with another contact sensor 128, or device 104, the contact sensor 126 may act on its own or with motion detector 112 to cause an activation signal to be sent to the processor(s) 108, the timer 110, and/or the detection notification component 118.

When the processor(s) 108, the timer 110, and/or the detection notification component 118 have been activated, the detection notification component 118 can initiate communication with the other bumped device 102, 104 by issuing a discovery communication via wireless interface 114. Wireless interface 114 can be implemented to send and receive data and instructions using any wireless communication technology known in the art, including technologies promulgated by groups such as the Bluetooth Special Interest Group, the Tnfrared Data Association (IRDA), and the Near Field Communication Forum (NFC).

In one implementation, the discovery communication can query if other devices are within range of the communication capability of wireless interface 114. If such device(s) exist and have a capacity to communicate with the wireless interface 114 of the device 102, 104 issuing the discovery communication, the other device(s) can affirmatively answer the discovery communication. For example, portable device 102 can be a mobile phone carried by a conference attendee in a crowded conference hall. The conference attendee can use the device 102 to initiate bump contact 106 with the mobile phone 104 of another conference attendee with whom he wishes to exchange information. If the bump contact 106 is detected by the motion detector 112 of device 102 to be above the motion or contact threshold, the device 102 can issue a discovery communication via the wireless interface 114 which may be received by a multitude of mobile phones and/or devices being carried by other conference attendees in the vicinity of device 102 and which are capable of communicating with device 102.

The device 102 can restrict its search for the other bumped device by querying all of the devices to determine which devices have recently experienced a bump. In this way device, 102 can determine which device has a mutual or similar bump time within a certain coincidence of the bump experienced by device 102. In one implementation, device 102 can make public the timestamp generated by timer 110 at or near the time of the bump, and can query whether the other devices have detected a bump at or around the same time. Alternatively, the device 102 can query the other devices for timestamps associated with times in which they received and detected bumps and compare these to the timestamp associated with the bump created by timer 110 of device 102. In another possible implementation, device 102 can query other devices for information regarding users with which the other devices may have registered contact at, for example, sensor 128. If this contact information matches the contact information registered at sensor 126 on device 102, device 102 may infer that both devices were being held by the same user and thus were bumped together by the user.

In yet another possible implementation, the device 102 may make no queries and offer no information regarding the bump contact 106, but instead wait to receive a report from another device 104 involved in the bump contact 106. This report may include details of the bump contact 106 such as, for example, the magnitude, speed, direction, time duration, etc., of the bump contact 106 detected at device 104. If no report is received by device 102, or if the report is received outside of a predetermined time window following the bump contact 106, or if more than one device reports, the device 102 may refuse to communicate with the reporting device(s). Alternatively, if the report is received from a device 104 within the predetermined time window, device 102 may review the report and use information included in the report—including, for example, information such as the magnitude, speed, direction, time duration, etc., of the bump contact 106 detected at device 104—to confirm the identity of the other device 104 as being the device which bump contacted device 102.

In yet another possible implementation, the device 102 can query other devices 102, 104 for motions indicating a force approximately equal in magnitude, but opposite in direction, to the force causing the motion detected by the motion detector 112 or device 102. This comparison of forces may be used on its own, or in addition to, the comparison of timestamps, as discussed above, to determine which other device 102, 104 shared the bump contact 106.

Depending on the devices 102, 104 communication capabilities, and on the types, accuracies, and precisions of the timers 110 implemented in the devices 102, 104, timestamps of the same event may be noticeably different. Detection notification component 118 can be implemented to take this into account and determine that, for example, a timestamp from another device within a minute of the timestamp issued by the device 102 represents the same detected bump. In another implementation, an acceptable discrepancy could be set at 30 seconds, 2 minutes, 5 minutes, etc.

In an alternate embodiment, the time synchronization between the timers 110 in the two devices 102, 104 can be implemented to be less than a millisecond. Examples of such time synchronization may be found in U.S. Patent Application 20050093868 to Kenneth P. Hinckley; Elson, J., Girod, L., Estrin, D., Fine-Grained Network Time Synchronization using Reference Broadcasts. ACM SIGOPS Operating Systems Review, 2002. 36(SI): p. 147-163; and Elson, J., Römer, K. Wireless Sensor Networks: A New Regime for Time Synchronization. Proc. First Workshop on Hot Topics In Networks (HotNets-I). In such an instance the acceptable discrepancy between timers 110 in the devices 102, 104 can be set to millseconds.

In another embodiment, the difference in local clock times between devices 102 and 104 can be calculated given their respective clock times. This may reduce the uncertainty in bump time between devices. This is accomplished by devices 102 and 104 simply sharing their respective local clock times over a communication channel and within a known latency tolerance of the communication channel.

The detection notification component 118 can also tailor or adjust the acceptable timestamp discrepancy based on the type of device 104 with which it is communicating. For example, if device 104 is another mobile phone, detection notification component 118 may assume that the timer 110 in the other device 104 should be accurate relative to the timer 110 in device 102, and set the maximum allowable discrepancy between timestamps at, for example, 1 second or less. In another implementation, if the device 102 is communicating with a programmable light switch, the detection notification component 118 in device 102 can recognize that the timer 110 in the programmable light switch is not as accurate, and correspondingly adjust the allowable discrepancy between timestamps to be, for example, 90 seconds.

Once an acceptable discrepancy is set, and if the detection notification component 118 determines the timestamps to be close enough to each other as to indicate that the devices 102, 104 experienced the same bump, detection notification component 118 can initiate an exchange of information between device 102 and the other device 104. In an example implementation, the devices 102, 104 can exchange similar information such as electronic business cards. In such an implementation, device 102 can be configured to accept only business card information with certain fields, such as personal information fields including a name field, an address field, a phone number field, etc. If the communicating device 104 tries to exchange some other type of data with device 102, such as an electronic resume for example, or access some other type of data on device 102, the transaction can be rejected by the detection notification component 118. Additionally, an error message can be presented to the users of one or both devices 102, 104 by the detection notification component 118 informing the user(s) of the rejection, and reiterating the rules of the transfer (i.e. only business card type fields).

In another implementation, the device 102 can be set to a data gathering mode in which the device can receive data and instructions from another device but cannot transmit any data to any other devices. In one example, the device 102 can be a PDA which a user at a trade show bumps into a portable or fixed computing-based device at a trade show display to download information of interest associated with the trade show display. If the bump has a magnitude above the required motion or contact threshold, the device 102 can initiate communication with the bumped computing-based device at the trade show display, and download information, such as product or service specifications and other marketing materials from the display.

In such a configuration, the downloaded data and/or instructions can be confined to the isolation area 122 of computer-readable media 116 to isolate viruses and the like that may be received in the instructions and/or data, and to preclude the viruses from attacking the rest of the device 102. Moreover, if the device associated with the trade show display attempts to access data on the device 102, or load data or instructions to an area outside of the isolation area 122, an error message can be presented to users of one or both devices 102, 104 by the detection notification component 118 informing the user(s) of the rejection, and reiterating the rules of the transfer (i.e. materials from the display device are accepted in the isolation area 122 only).

In yet another implementation, the portable device 102 can be used to pair or associate devices 102, 104. For example, a user may bump a first device 104 and then subsequently bump a second device 104 thus pairing or bump associating the devices 102, 104 together. In one exemplary implementation, a user can use a mobile phone to bump a programmable light switch and a light fixture to which the user wishes the light switch to be associated. In this way, the user can associate the light fixture and the light switch such that the switch can activate or deactivate the light fixture. In such a scenario, the phone or other portable device 102 can bump contact the first device 104 (for example the light switch) and if the bump is above a set threshold value as detected by the motion detector 112, communication can be initiated by the detection notification component 118 between the device 102 and the first device 104. This communication can include downloading the identity of the first device 104 by the portable device 102, and any passwords, data, and/or instructions that may be needed to locate, access, and/or interact with the first device 104.

The portable device 102 can then transfer this information to the second device 104 via a bump contact. Once the portable device 102 is bumped against the second device 104 with force sufficient to create motion equaling or exceeding the threshold detected by motion detectors 112, the detection notification component 118 in each of the portable devices 102, 104 can initiate communication between the devices 102, 104 and allow for the transfer to the second device 104 of pairing information, such as an identity of the first device 104, and any passwords, data, and/or instructions needed to locate, access, and/or interact with the first device 104, which were previously downloaded into the portable device 102.

Such pairing could also be extended to several devices. For example, a user can use a portable phone to bump one programmable light switch, and then bump several light fixtures and/or electrical outlets which the user wants to be associated with the switch. In another possible implementation, the user can use a PDA to bump associate a thermostat and several different devices in rooms throughout a building to regulate the room temperatures with the thermostat. In yet another implementation, a user can use an Mp3 player to associate a wireless speaker to an output channel or jack of a stereo by bump contacting both the speaker and a computing-based device associated with the channel.

Alternately, the user may use the portable device 102 to bump contact various devices as described above and download pairing information associated with the devices, including various identities, passwords, locations, etc. The user can then transfer information associated with the devices to a computer by bump contacting the computer, or by other known means such as transfer of information via a wired connection, and allow the computer to complete the association of the various devices.

Additionally, the pairing of devices may be established without the use of an intermediate device, such as portable device 102 noted above. For example, peripherals that a user wishes to associate with a given computer, such as a wireless keyboard, a wireless mouse, a printer, and/or a monitor, may be associated with the computer by individually bump contacting the peripherals with the computer. Similarly, gaming controllers may be associated with a game console or gaming device by bumping the controllers directly to the game console. Additionally, a gaming controller can be associated with an individual channel of the game console by bump contacting the desired channel. Moreover, several game consoles can be associated or networked by bumping them together to allow multiple players to play in the same game space.

Downloaded information from any of the devices to be paired or associated with another device can be restricted to the isolation area 122 by the detection notification component 118. In addition, the detection notification component 118 can also enforce restrictions on the type or volume of pairing information which may be accepted into device 102. Moreover, password activation may be required on the portable device 102 and/or the other devices 104 before pairings can be made. Such passwords can include codes entered into the devices 102, 104 or a preset series of bumps, similar to the multiple bumps which may be used for the creation of an encryption key 124.

The portable devices 102, 104 can also be initiated for communication with common or synchronous motions. For example, devices 102, 104 can be shaken in the same direction, at the same speed, and/or with the same acceleration. In one implementation, a user can hold the two mobile phones and move them together, such as up and down, or side to side. In this manner, motion detectors 112 in each device 102, 104 can detect the similar motion in the form of direction, acceleration, and/or velocity. If the motion equals or exceeds the preset threshold, and the times of motion of the two phones are within a coincidence, then the detection notification components 118 in each phone can initiate communication between the phones via wireless interface 114. Alternatively, if the sequence of motions is the same, the timestamps may not be needed by the detection notification components 118 to initiate the communication between the devices 102, 104.

Moreover, the relative orientation between the devices 102, 104 may also be used to establish and/or confirm the identities of the bumped devices 102, 104. For example, if during the bump contact 106, device 102 experiences a downward acceleration, it may be inferred that the device 104 bump contacting device 102 would have had to experience an upward acceleration and have been above device 102. Information communicated from a device to the contrary of such assumptions may be used to disqualify the device from communicating further with device 102. Examples of such device orientation comparison techniques may be found in U.S. Patent Application 20050093868 to Kenneth P. Hinckley.

Additionally, various markings can be placed on the outside of the devices 102, 104 to provide users a guide as to where to bump and/or in what direction to move and/or contact the devices 102, 104 in order for the motion to be detected by motion detector 112. For example, if the motion detector 112 includes an accelerometer that detects the motion in only one direction, an arrow marking can be placed on the outside of the devices 102, 104 in the direction of the movement that can be detected by the accelerometer.

In all of the above embodiments, anonymous communication between bumped devices 102, 104 can be accomplished through use of a central server (not shown in FIG. 1 for the sake of graphic clarity). For example, after experiencing bump contact 106, devices 102, 104 may separately communicate messages to the server, including the time of the bump contact 106, its duration, magnitude direction, etc. Using this information, the server may then decide if devices 102, 104 experienced the same bump contact 106 and on this basis establish communications between the devices 102, 104 through the server. Moreover, in this way the devices 102, 104 can communicate anonymously with each other through the server, without furnishing any address information, such as an actual Internet address, to the other device.

Magnitudes of Motion of Devices

Figure 2:
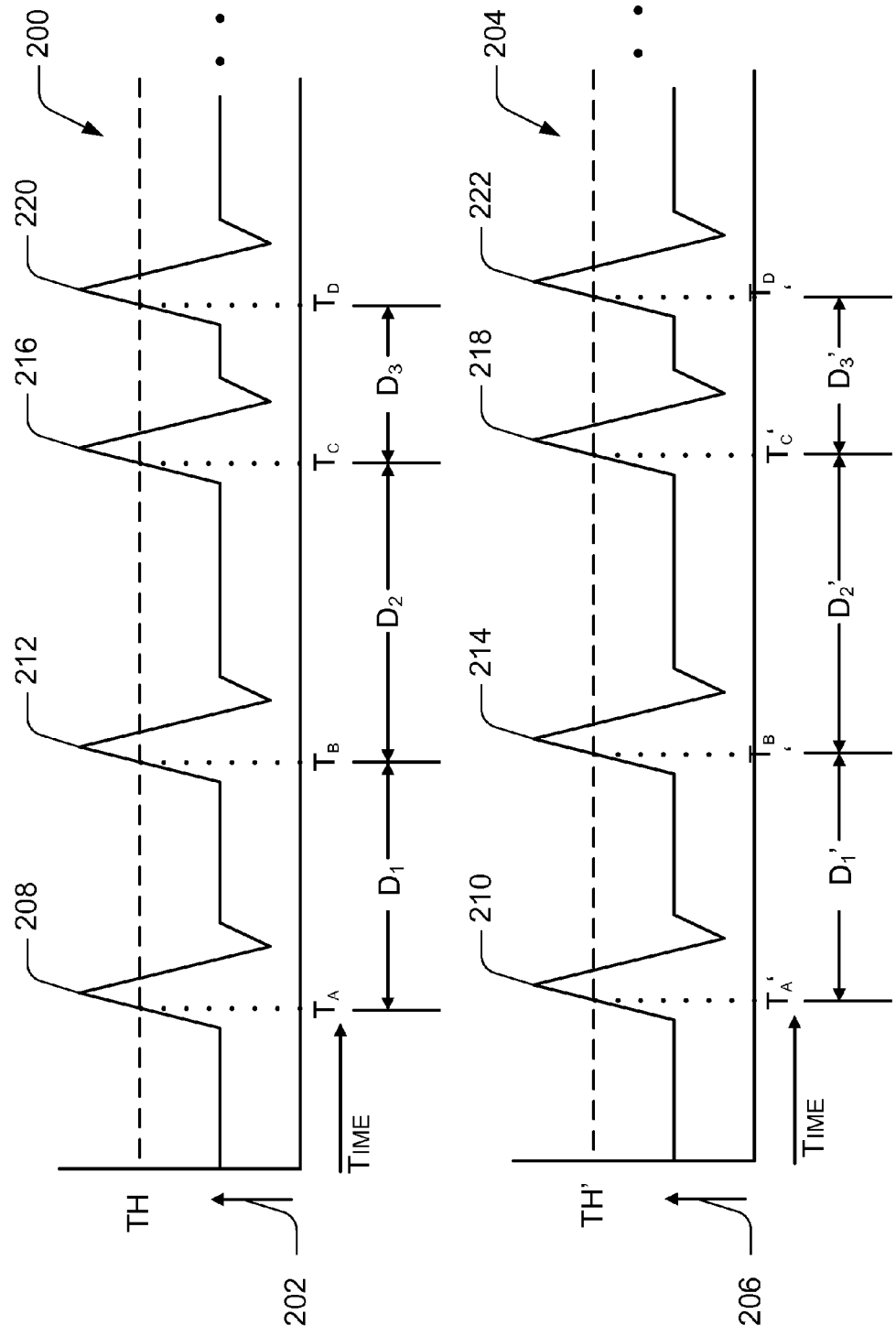
FIG. 2 illustrates two graphs showing a magnitude of motion with respect to time in embodiment(s) of motion detection notification.

FIG. 2 includes two graphs that illustrate magnitudes of motion of the devices 102, 104 of FIG. 1 with respect to time. Graph 200 shows a magnitude of motion 202 of portable device 102 with respect to time as measured by motion detector 112 in portable device 102. Similarly, graph 204 shows a magnitude of motion 206 of device 104 with respect to time as measured by the motion detector 112 in device 104.

For example, if device 102 is bump contacted with device 104, the motion detectors 112 in both devices 102, 104 can register magnitudes of motion such as indicated by peaks 208 and 210. When the measured magnitude of motion of device 102 equals or exceeds the preset threshold TH, a timestamp $T_A$ can be issued by the timer 110 in the portable device 102.

Similarly, if the measured magnitude of motion of device 104 equals or exceeds the preset threshold TH', a timestamp $T_A'$ can be issued by the timer 110 in the portable device 104.

As mentioned above in conjunction with FIG. 1, the timestamps $T_A$ and $T_A'$ can be used by the detection notification components 118 in devices 102, 104 to determine if a mutual bump exists between devices 102, 104. If it is determined that a mutual bump exists between devices 102, 104, then communication can be initiated between devices 102, 104.

It is also possible to bump the devices 102, 104 together several times resulting in multiple shared magnitude peaks in graphs 200, 204. For example, if after the initial bump resulting in peaks 208, 210 the devices 102, 104 are bumped again, successive magnitude peaks 212, 214 result. If the magnitudes of these peaks 212, 214 equal or exceed the respective thresholds TH and TH', then corresponding timestamps $T_B$ and $T_B'$ can also be created. Successive bumps of devices 102, 104 can result in similar magnitude peaks, such as peaks 216, 218 resulting in the creation of corresponding timestamps $T_C$ and $T_C'$, and peaks 220, 222 resulting in the creation of corresponding timestamps $T_D$ and $T_D'$.

The time duration between timestamps of the respective devices can then be measured by the detection notification components 118 in devices 102, 104. For example, in graph 200, the time duration between the first and second bumps represented by peaks 208 and 212 can be found by examining the difference between timestamps $T_A$ and $T_B$, namely $D_1$. Similarly the time duration between the second and third bumps represented by peaks 212, 216 can be found by examining the difference between timestamps $T_B$ and $T_C$, namely $D_2$. In like fashion, the time duration between the third and fourth bumps represented by peaks 216, 220 can be found to be $D_3$.

The time durations between bumps detected by device 104 as shown by the magnitude peaks 210, 214, 218, and 212 in graph 204 can be found in a similar manner. For example, the time duration between the first and second bumps represented by peaks 210 and 214 can be found by determining the time duration between timestamps $T_A'$ and $T_B'$, namely $D_1'$. Similarly that time duration between the second bump represented by peak 214 and the third bump represented by peak 218 may be found to be $D_2'$. Additionally, the time duration between the third bump represented by peak 218 and the fourth bump represented by peak 222 may be found to be $D_3'$.

The time required by device 102 and device 104 to react to a detected bump and issue a timestamp may not be the same. However, this lag time is essentially constant for each device 102. For example, an approximately equivalent time duration between detecting bumps and creating a timestamp will exist for each of the bumps detected by device 102. This accuracy can be affected by the respective accuracies of the timers 110 and time stamping by the motion detectors 112 in the devices 102, 104. Similarly, a potentially different time duration may exist for device 104, but this time duration will be approximately the same for each bump detected by device 104. When the times associated with timestamps are subtracted from one another, the time duration cancels out, leaving the real time duration between detected bumps. For example, time stamp $T_A$ can represent the time that a first bump occurred plus a lag time (Tb+lag time). Similarly, timestamp $T_B$ can represent the time that a second bump occurred plus the same lag time (Tb2+lag time). Accordingly, when the time associated with $T_A$ is subtracted from the time associated with $T_B$, the result is:

$$(Tb2+\text{lag time})-(Tb+\text{lag time})=Tb2-Tb=D_1$$

Therefore, $D_1$ represents the real time duration between the occurrence of the first and second bumps as experienced by device 102. The same logic holds for device 104. Thus $D_1'$ gives the real time duration between the first and second bumps as experienced by device 104. Correspondingly, $D_1=D_1'$, $D_2=D_2'$, $D_3=D_3'$, etc.

Once the times $D_1$, $D_1'$, $D_2$, $D_2'$, $D_3$, $D_3'$ between bumps have been determined, communication between the devices 102, 104 can be initiated. Either of the bumped devices 102, 104 can also transmit a discovery communication to detect if other devices capable of wireless communication are within communication distance. Devices which respond in the affirmative can then be queried to determine if they have detected a bump recently, and if so when. Alternately, one of the devices 102, 104 can make public a timestamp associated with one of the bumps, such as $T_A$, $T_A'$, $T_B$, $T_B'$, etc. Regardless of which device 102, 104 makes public the timestamp, the other device 102, 104 can evaluate it against its existing timestamps to see if there is an acceptable correspondence indicating that the devices 102, 104 have shared a bump. If so, the devices 102, 104 can begin communicating as described above in conjunction with FIG. 1.

The devices 102, 104 can also be implemented for secure communication by utilizing the time durations between bumps, such as $D_1$, $D_2$, $D_3$, $D_1$, $D_2$ and $D_1'$, $D_2'$, $D_3'$ for the creation of private and/or public cryptographic keys common to both device 102 and device 104. Since, as elucidated above, $D_1=D_1'$, $D_2=D_2'$, $D_3=D_3'$, etc., the devices 102, 104 each posses sufficient data to create shared numbers. These shared numbers can be used with any cryptographic methods known in the art to create a private key for each device 102, 104 which enables secure communication between devices 102, 104.

In addition to using pairs such as $D_1$, $D_1'$; $D_2$, $D_2'$; and $D_3$, $D_3'$, the devices 102, 104 can also use combinations of these times to create shared numbers. For example one shared number could include $D_1'+D_2'$ for device 104, which would have a corresponding number of $D_1+D_2$ for device 102. In this manner many different combinations of shared numbers between device 102 and device 104 can be created and subsequently used to generate encryption keys 124 for secure communication.

Clock generators in common mobile devices, such as mobile phones, can be implemented as the timer 110 in devices 102, 104, and are may be driven by a quartz crystal with a time accuracy of 100 ppm (parts-per-million). If approximately one second elapses between detected bumps, a value can be derived from the time duration between the detected bumps with a 1000 ppm accuracy, or a three digit number. Combining values derived from the time durations between multiple bumps can extend a local private-but-shared number for use in a public-private key scenario for cryptographic communication.

In addition to bump contacting devices 102, 104, as discussed in the examples above, the devices 102, 104 may also be subjected to common motions. For example, a user can initiate secure communication between two mobile phones by placing the mobile phones together and moving them through several different motions as one unit. In one implementation, the motions could be up and down shaking motions akin to a bartender mixing a martini. Other possible implementations include side-to-side motions and mixtures of up and down and side-to-side motions, etc.

As a result of the shared motions of the devices 102, 104, the motion detectors 112 in devices 102, 104 can detect similar movement information, including accelerations, directions, and velocities at similar times and/or time intervals. For instance, if both devices are shaken like a martini mixer, and the resulting motion creates movement information that is detected to equal or exceed the threshold needed for the motion detectors 112 in devices 102, 104 to detect the motions, then a great variety of shared information may be detected. For example, the motion detectors 112 in devices 102, 104 may detect an Easterly motion followed by a Westerly motion followed by a Northerly motion. This sequence of shared detected motions can be utilized to create a private key for cryptographic communication. Similarly, a sequence of shared velocities of the devices having magnitudes above the threshold detected by the motion detectors 112 in the devices 102, 104 may also be used to create a shared sequence of numbers. The same can be said for shared accelerations.

Moreover, all of the above movement information, including bump contacts, may be combined to create even more sophisticated shared numbers between devices 102 and 104. For example, devices 102, 104 may be bumped, shaken like a martini, and bumped again to create a complex list of shared data which can be converted into shared numbers between devices 102, 104. Further, more than two devices can be used or included in any of the above mentioned examples. For example, a user may hold three or four phones together and initiate secure communications between the phones by shaking them and/or bumping them together.

Exemplary Method

Methods for motion detection notification, such as exemplary methods 300 and 400 described with reference to respective FIGS. 3 and 4, may be described in the general context of computer executable instructions. Generally, computer executable instructions can include routines, programs, objects, components, data structures, procedures, modules, functions, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

Figure 3:
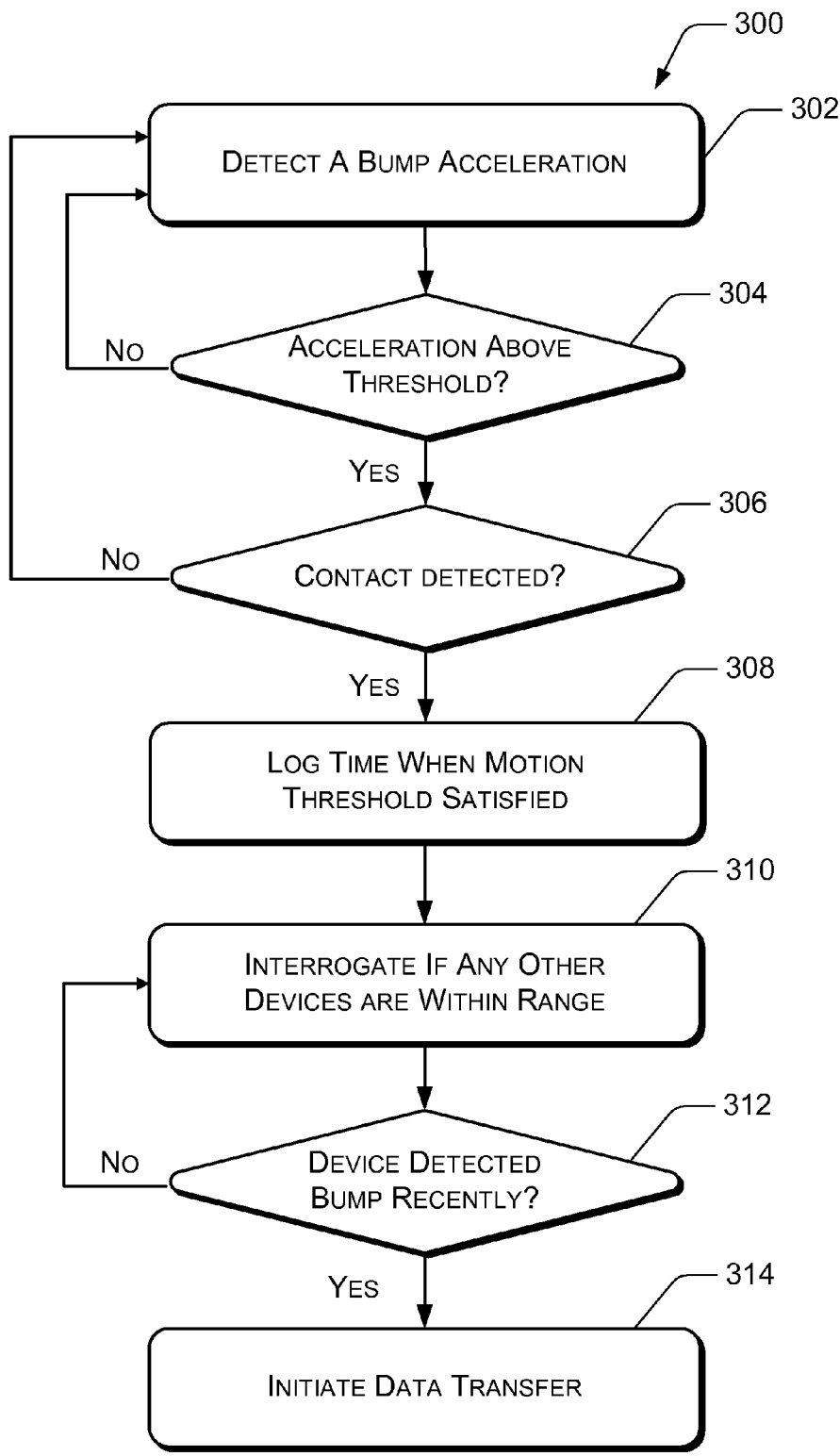
FIG. 3 illustrates exemplary method(s) for motion detection notification.

FIG. 3 illustrates an exemplary method 300 for motion detection notification and is described with reference to the detection notification system 100 shown in FIG. 1 and the exemplary magnitudes of motion versus time graphs 200 and 202 shown in FIG. 2. The order in which the method is described is not intended to be construed as a limitation, and any number of the described method blocks can be combined in any order to implement the method, or an alternate method. Additionally, individual blocks may be deleted from the method without departing from the spirit and scope of the subject matter described herein. Furthermore, the method can be implemented in any suitable hardware, software, firmware, or combination thereof.

At block 302, an acceleration from a bump is detected. For example, when devices 102 and 104 are bumped together, an acceleration of each device caused by the bump can be detected by the motion detectors 112 in each device 102, 104.

At block 304, a determination is made as to whether the acceleration from the bump exceeds a preset threshold. If the detected acceleration does not exceed the preset threshold (i.e., "no" path from block 304), then method 300 returns to block 302 and waits to detect the acceleration from another bump. If the detected acceleration does exceed the preset threshold (i.e., "yes" path from block 304), then a method 300 continues to block 306.

At block 306, a determination is made as to whether contact has been made with another device, another sensor, and/or a user. If it is determined that no contact has been made (i.e., "no" path from block 306), then method 300 returns to block 302 and waits to detect the acceleration from another bump. If, however, it is determined that contact was made (i.e., "yes" path from block 306), then a time when the bump occurred which created the contact and/or the acceleration exceeding the threshold at block 304 is logged at block 308. For example, a timestamp can be created by timer 110 at the time the acceleration is detected to exceed the threshold, or at the time the contact has been made.

At block 310, an interrogation is made to determine if any other device capable of wireless communication is within communication distance. For example, the interrogation may include a discovery communication transmitted using technologies promulgated by groups such as the Bluetooth Special Interest Group, the Infrared Data Association (IRDA), and the Near Field Communication Forum (NFC).

At block 312, a determination is made as to whether any devices answer the interrogation in the affirmative, and they are further queried to determine if they have detected a bump recently. "Recently" may be predefined to be anywhere from fractions of a second to more than a few minutes, and may depend on the communication capabilities of the devices. For example, if the devices are such that they do not have accurate timers 110, "recently" may be preset to mean within several minutes of one another. Alternatively, if the devices are mobile phones with timers 110 synched to a very accurate clock, "recently" could be preset to be only a fraction of a second. In one exemplary embodiment, the definition of "recently" can be reduced if the devices 102, 104 share their local times.

If the communicating device did not experience a bump, or the bump was not experienced "recently" (i.e., "no" path from block 312), the method returns to block 310 and queries other devices. If the communicating device did experience a bump "recently" (i.e., "yes" path from block 312), then it is inferred that the device shared the same bump that created the acceleration in block 302 and data transfer is initiated at block 314. For example, if it is determined that device 104 received a bump recently with respect to a bump received by device 102, then communication is initiated by the detection notification component 118 in device 102 and/or the detection notification component 108 in device 104 enabling devices 102, 104 to exchange data and instructions wirelessly via wireless interface 114.

Another Exemplary Method

Figure 4:
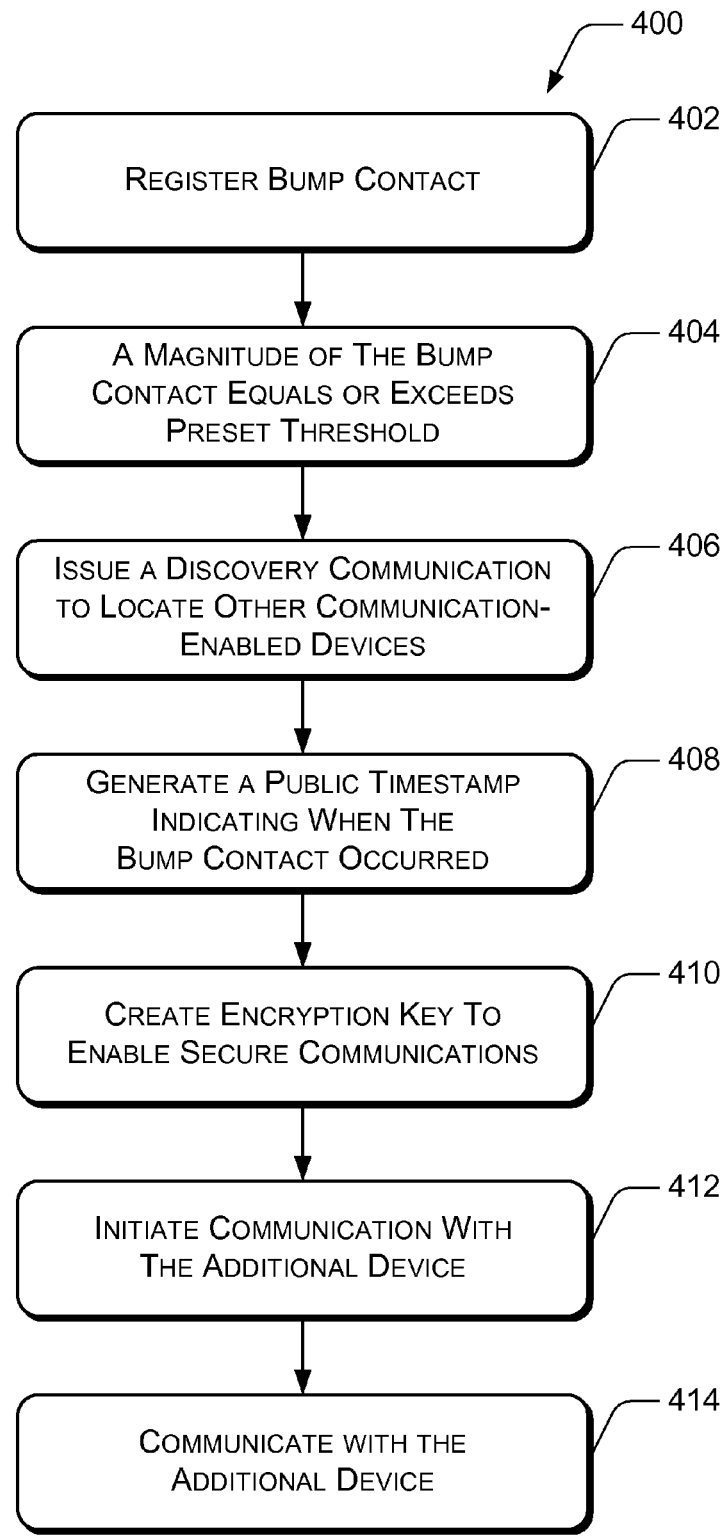
FIG. 4 illustrates exemplary method(s) for motion detection notification.

FIG. 4 illustrates an exemplary method 400 for motion detection notification and is described with reference to the detection notification system 100 shown in FIG. 1 and the exemplary magnitudes of motion versus time graphs 200 and 202 shown in FIG. 2. The order in which the method is described is not intended to be construed as a limitation, and any number of the described method blocks can be combined in any order to implement the method, or an alternate method. Additionally, individual blocks may be deleted from the method without departing from the spirit and scope of the subject matter described herein. Furthermore, the method can be implemented in any suitable hardware, software, firmware, or combination thereof.

At block 402, a bump contact is registered between at least two devices, wherein one of the devices is a portable computing-based device, such as a game controller, keyboard, remote control, laptop, mobile phone, printer, mp3 player, monitor, PDA, mouse, assorted computer peripherals, etc, while the other device is an additional device. The additional device may be another portable computing-based device, or it may be a stationary computing-based device, such as a thermostat, or a fixed display device in a store or at a convention. The bump contact can be registered by detecting a direction of motion of the portable device, a velocity of the motion of the portable device, and/or acceleration of the portable device, or an approximate time at which the bump contact occurred. In one implementation, registering a bump contact can also include registering numerous successive bump contacts between the two devices.

At block 404, a magnitude of the bump contact is determined to be at least equivalent to a preset threshold in the portable device. For example, portable device 102 includes a detection notification component 118 that determines if motions detected by motion detector 112 equal or exceed a preset threshold. Alternately, the motion detector 112 itself can establish whether the motion exceeds the preset threshold.

At block 406, a discovery communication is issued to determine if any other communication-enabled devices are within communication range. For example, portable device 102 wirelessly transmits an interrogation via wireless interface 114 to determine whether any wireless communication equipped devices are within communication range. In this way, the portable device 102 seeks to establish contact with the additional device bumped at block 402.

At block 408, a public timestamp indicating when the bump contact occurred is generated to allow the portable device and/or the additional device to determine if a shared bump contact exists between the devices. A lag time may exist between the occurrence of the motion and the action of issuing the timestamp. Also the timestamp will be relative to the timer 110 in the device issuing the timestamp.

At block 410, an encryption key is created to enable secure communications between the portable device and the additional device. For example, the encryption key can be created using information from successive bump contacts between the portable device 102 and the additional device 104, such as time durations between given bumps. Additionally, the encryption key can be created using other motion information detected by motion detector 112, such as velocities, accelerations, and directions of the portable device 102 and the additional device 104. Moreover, the encryption key can be created from any combination of the bump or motion information 120 discussed above.

At block 412, communication with the additional device is initiated in response to detecting the bump contact and determining the magnitude of the bump contact. This communication may be secure or unsecured. For an unsecured communication, only the shared bump need be detected. Once the portable device 102 and the additional device 104 compare, for example, timestamps, and determine that a common bump has occurred, the portable device 102 and the additional device 104 can initiate communication with each other. For secure communication to be initiated, various shared information 120 between the portable device 102 and the additional device 104, such as multiple successive bumps, or shared motion with various speeds, accelerations, and/or directions can be used to create private keys common to the portable device and the additional device for encrypted communication.

At block 414, communication proceeds between the devices. For example, data and/or instructions are communicated between the portable device 102 and the additional device 104.

Exemplary Computing-based Device

Figure 5:
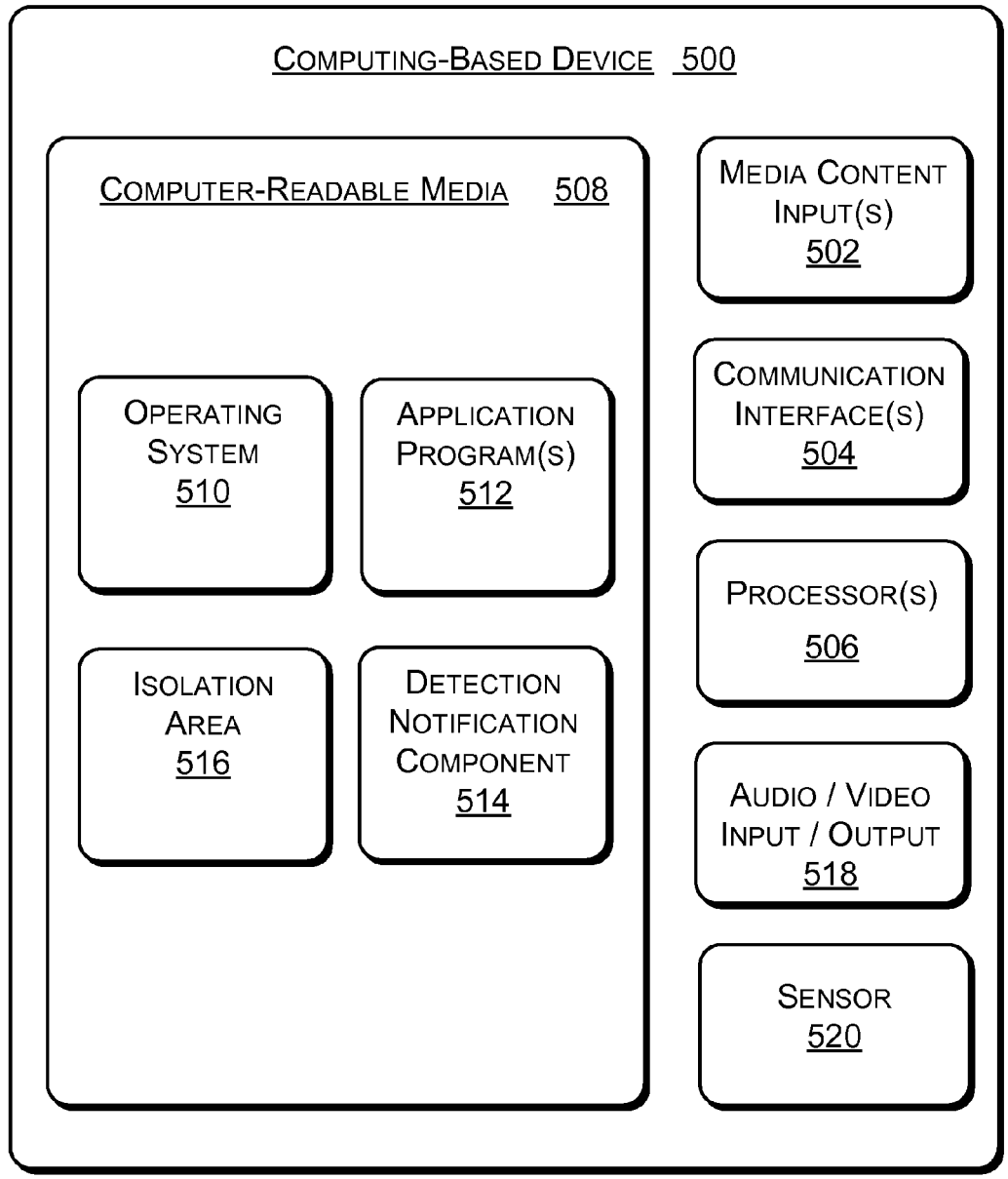
FIG. 5 illustrates an exemplary computing-based device in which embodiments of motion detection notification can be implemented.

FIG. 5 illustrates various components of an exemplary computing-based device 500 which can be implemented as any form of a computing and/or electronic device, and in which embodiments of motion detection notification can be implemented. For example, the computing-based device 500 can be implemented as the computing-based portable device 102 and/or as the additional computing based device 104 shown in FIG. 1.

Computing-based device 500 includes one or more media content inputs 502 which can include Internet Protocol (IP) inputs over which streams of media content are received via an IP-based network. Device 500 further includes communication interface(s) 504 which can be implemented as any one or more of a serial and/or parallel interface, a wireless interface, any type of network interface, a modem, and as any other type of communication interface. In one implementation, the communication interface(s) 504 can include the wireless interface 114 shown in FIG. 1. A wireless interface enables computing-based device 500 to receive control input commands and other information from an input device, such as from devices 102, 104 shown in FIG. 1.

A network interface provides a connection between the computing-based device 500 and a communication network by which other electronic and computing-based devices can communicate data with device 500. Similarly, a serial and/or parallel interface provides for data communication directly between computing-based device 500 and the other electronic or computing devices. A modem facilitates communication between computing-based device 500 and other electronic and computing devices via a conventional telephone line, a DSL connection, cable, and/or other type of connection.

Computing-based device 500 also includes one or more processors 506 (e.g., any of microprocessors, controllers, and the like) which process various computer executable instructions to control the operation of computing-based device 500, to communicate with other electronic and computing devices, and to process instructions and data in conjunction with the detection notification component 108 shown in FIG. 1.

Computing-based device 500 can also be implemented with computer-readable media 508, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), a DVD, a DVD+RW, and the like.

Computer-readable media 508 provides data storage mechanisms to store various information and/or data such as software applications and any other types of information and data related to operational aspects of computing-based device 500. For example, an operating system 510 and/or other application programs 512 can be maintained as software applications with the computer-readable media 508 and executed on processor(s) 506. The application programs 512 can include a detection notification component 514 programmed to implement embodiments of motion detection notification. In one embodiment, detection notification component 514 is an example of the detection notification component 118 shown in FIG. 1.

The computer-readable media 508 can also include an isolation area 516 in which data and instructions input to the computing-based device 500 are isolated from the rest of the computing-based device 500. In this manner viruses that may be received in the input data and instructions can be effectively contained, and their ill effects on computing-based device 500 limited or entirely ameliorated.

The computing-based device 500 may also include an audio and/or video output 518 that provides audio and video to an audio rendering and/or display system, or to other devices that process, display, and/or otherwise render audio, video, and image data. As a portable device, video signals and audio signals can be communicated to an integrated display device and to integrated audio rendering components.

Moreover, the computing-based device 500 can include a contact sensor 520 configured to detect a contact between device 500 and other similar computing-based devices. Alternately, sensor 520 may be configured to detect contact between the computing-based device 500 and other sensors similar to sensor 520. In yet another possible implementation, sensor 520 may be configured to detect contact between the computing-based device 500 and a user, such as a user who might be holding computing-based device 500 in his hand. Contact sensor 520 can be implemented with metal or metalized contacts, and/or with any other device or technology known in the art which may be used to measure physical contact between the sensor 520 and a device, the sensor 520 and another sensor; and/or the sensor 520 and a user. Sensor 520 may also be implemented to collect information regarding individual users, including such qualities as pulse, temperature, etc.

CONCLUSION

Although embodiments of motion detection notification have been described in language specific to structural features and/or methods, it is to be understood that the subject of the appended claims is not necessarily limited to the specific features or methods described. Rather, the specific features and methods are disclosed as exemplary implementations of motion detection notification.

The invention claimed is:

1. A computing-based device, comprising:
  a motion detector configured to:
    detect a first motion of the computing-based device and issue a first activation signal when the first motion has a magnitude greater than a preset threshold; and
    detect a second motion of the computing-based device and issue a second activation signal when the second motion has a magnitude greater than the preset threshold; and
  a detection notification component configured to:
    receive the first activation signal and the second activation signal;
    initiate communication with an additional computing-based device that detects motions corresponding to the first motion and the second motion of the computing-based device, the additional computing based device being configured for communication with the computing-based device;
    determine a time duration between the first activation signal and the second activation signal; and
    use the time duration to create an encryption key to enable secure communication with the additional computing-based device.

2. A computing-based device of claim 1, wherein the motion detector is further configured to detect the first and second motions as bump contacts between the computing-based device and the additional computing-based device.

3. A computing-based device of claim 1, further comprising a processor configured to activate after the first motion is detected, the processor further configured to execute the detection notification component to initiate the communication with the additional computing-based device.

4. A computing-based device of claim 1, wherein the first activation signal and second activation signal are non-consecutive activation signals.

5. A computing-based device of claim 1, further comprising a timer from which the detection notification component determines the time duration, and wherein the motion detector is an accelerometer.

6. One or more computer-readable media comprising computer executable instructions that, when executed, direct a computing-based device to:
  detect a motion of the computing-based device;
  generate a credential that corresponds to the motion being detected when the motion exceeds a threshold value;
  initiate communication with an additional device having an associated credential; and
  communicate the credential to the additional device such that the additional device can compare the credential to the associated credential to form a basis for communication between the additional device and the computing-based device.

7. One or more computer-readable media of claim 6, further comprising computer executable instructions that, when executed, direct the computing-based device to at least one of register a direction of the motion of the computing-based device when the motion is detected, register a velocity of the motion of the computing-based device when the motion is detected, or register a time associated with the motion of the computing-based device.

8. One or more computer-readable media of claim 7 further comprising computer executable instructions that, when executed, direct the computing-based device to generate the credential based on at least one of the direction of the motion, the velocity of the motion, or the time associated with the motion.

9. One or more computer-readable media of claim 6, further comprising computer executable instructions that, when executed, direct the computing-based device to generate the credential to form a basis for encrypted communication with the computing-based device.

10. One or more computer-readable media of claim 6, further comprising computer executable instructions that, when executed, direct the computing-based device to restrict the communication with the additional device to a selectable type of information.

11. One or more computer-readable media of claim 6, further comprising computer executable instructions that, when executed, direct the computing-based device to:
  detect the motion of the computing-based device as a bump contact between the computing-based device and the additional device;
  generate the credential based on one or more characteristics associated with the bump contact being detected when the bump contact exceeds the threshold value; and
  generate an encryption key from the credential to enable secure communications between the computing-based device and an additional device.

* * * * *